(12) United States Patent
Blersch

(10) Patent No.: US 7,646,376 B2
(45) Date of Patent: Jan. 12, 2010

(54) ELECTRONIC UNIT

(75) Inventor: Christian Blersch, Weichs (DE)

(73) Assignee: E.E.P.D. Electronic Equipment Produktion & Distribution GmbH, Weichs (DE)

(*) Notice: Subject to any disclaimer, the term of this patent is extended or adjusted under 35 U.S.C. 154(b) by 527 days.

(21) Appl. No.: 11/482,382

(22) Filed: Jul. 7, 2006

(65) Prior Publication Data

US 2007/0018955 A1    Jan. 25, 2007

(30) Foreign Application Priority Data

Jul. 20, 2005   (DE)   ........................ 10 2005 033 950

(51) Int. Cl.
*G06F 13/00*   (2006.01)
*G06F 3/02*   (2006.01)

(52) U.S. Cl. ........................ 345/169; 345/172; 710/303; 710/304

(58) Field of Classification Search .......... 345/156–184, 345/903, 905; 710/303–304
See application file for complete search history.

(56) References Cited

U.S. PATENT DOCUMENTS 5,826,043 A * 10/1998 Smith et al. ................. 710/303
5,889,964 A * 3/1999 Cho et al. .................... 710/304
7,337,257 B2 * 2/2008 Landron et al. ............. 710/304

* cited by examiner

*Primary Examiner*—David L Lewis
(74) *Attorney, Agent, or Firm*—Pearne & Gordon LLP

(57) ABSTRACT

The invention relates to an electronic device (10) for providing predetermined functions for a user (1) of the device, with a man-machine interface of the device for allowing function-related inputs by the user and function-related outputs from the device, a processor-controlled computer device for processing the inputs of the user and generating the outputs from the device, and coupling means for the electrical and/or mechanical connection of the device to a device support (14) associated with the device. To achieve simpler operation and a wider scope of application for such a device, provision is made according to the invention for the device to have means of detection for detecting the presence of a connection of the device (10) to the device support (14), and for the processor-controlled computer device to effect a modification of the man-machine interface (12) in the presence of the connection. A particular advantage consists in the fact that the modification of the man-machine interface (12') can be specifically adapted, taking into consideration the application environment concerned (e.g. in the motor vehicle, in the home, etc.), in that during this modification the "device support type" is detected and taken into consideration by the device (10).

15 Claims, 4 Drawing Sheets

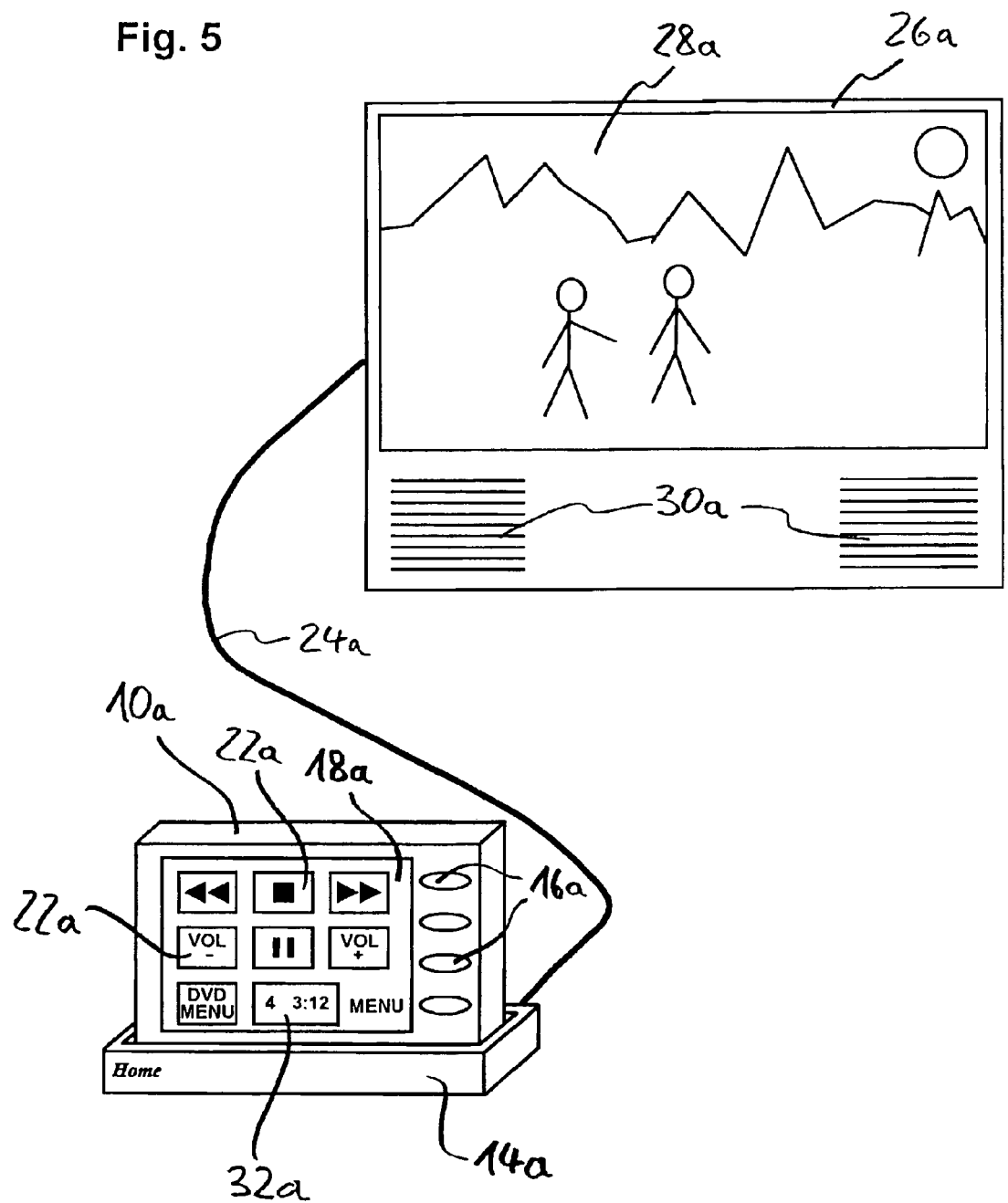

ELECTRONIC UNIT

BACKGROUND OF THE INVENTION

1. Field of the Invention

This invention relates to an electronic device for performing predetermined functions for a user of the device, with
- a man-machine interface of the device to allow function-related inputs by the user and function-related tasks of the device,
- a processor-controlled computer device for processing the inputs of the user and generating the outputs of the device, and
- means of coupling for the electrical and/or mechanical connection of the device to a device support associated with the device.

2. Description of the Prior Art

Such devices are known in many different designs, examples of which are electronic notebooks (organisers), personal digital assistances (PDA's) and mobile telephones, insofar as these devices have coupling means for electrical and/or mechanical connection to an associated (suitable) device support.

For the devices mentioned there is often a device support to be installed in a motor vehicle by means of which the unit concerned can be securely retained in the interior of the motor vehicle, wherein, in addition to a mechanical connection, an electrical connection is provided between the device and the support, e.g. in order to supply the device with current from the on-board mains. Motor vehicle supports for mobile telephones are also often used for enabling a handsfree set to be used for the device. In some motor vehicle supports for PDA's, a so-called GPS receiver may be connected in order to be able supply the driver with navigation functions (in particular a route guide) with suitable programming of the PDA.

In the electronic devices of prior art, or in the system formed from the unit and associated support, the support has not only its support function but also, if need be, functions which are limited to supplying a power supply and supplying "additional external device components".

The disadvantages of the devices of prior art is frequently rather complicated operation and limited applications.

SUMMARY OF THE INVENTION

An object of this invention is to allow simpler operation and wider scope of application of the device in supplying the predetermined functions by means of a device of the type already mentioned.

This object is achieved with an electronic unit according to Claim 1. The dependent claims relate to advantageous embodiments of the invention.

The electronic device according to the invention is characterised in that the device has means of detection for detecting the presence of a connection of the device to the device support, and in that the processor-controlled computer device effects a modification of the man-machine interface in the presence of the connection.

For the invention it is essential that the design of the man-machine interface of the device is not rigidly predetermined but is automatically modified when the device is connected to the associated device support.

In this case the possibility is in no way ruled out, and it is often even quite appropriate, for "additional external device components" and/or "further communication channels" to be provided by the device support connected to the device between the device and the user, as is known, for example, in the case of a mobile telephone, which, when inserted in a motor vehicle support, allows acoustic speech output via a speaker integrated in the support or connected to the support.

For the present invention, however, it is essential for the man-machine interface peculiar to the device to be automatically changed when the connection is made between the device and the device support.

The essence of the invention lies in the fact that the connection of an electronic device to a device support or its separation from the device support is in practice often associated with a change in the "functionality preferences of the user". For example, if the user of a PDA connects this device to his PC in his office by means of a device support designed as coupling unit ("docking station") to a PC, a high preference could be given, for example, to synchronising contact data (names, addresses, telephone numbers, etc.) which are on the one hand stored on the PC, and on the other in the PDA. On the other hand it will probably be relatively uninteresting to the user in this situation to allow the navigation software installed on the PDA to run. These preferences of the user vary suddenly when the user inserts the PDA into a motor vehicle support. In this situation it would desirable for access to the PDA navigation software and the mutual communication between the device and the user to be simplified whilst the navigation software is running. This in particular can be achieved by the invention by suitably modifying the man-machine interface of the PDA, in particular by adapting to user preferences which may be expected for use of the device in combination with the device support.

Due to the fact that many device supports are provided for a specific type of application environment (e.g. "mobile application", "application in private premises", etc.), a surprising advantage of the invention resides in the fact that the modification of the man-machine interface can be specifically adapted, taking into consideration the application environment concerned (e.g. in the motor vehicle, at home, etc.), this modification of the "device support type" concerned being detected and taken into consideration by the device.

The invention may be used for many types of electronic devices. In addition to the above-mentioned laptops, notebooks and mobile telephones, so-called combination devices or hybrid products in particular are also considered here, sold for example as "smartphones", "PDA phones" or as "feature phones", depending on the supplier. A common feature of all these devices is that the inputs of the user are processed by a processor-controlled computer device for generating the outputs of the device in order to provide the user with the desired functions. Such processor-controlled computer devices, e.g. comprising a microprocessor, a ROM, a RAM, etc., are well known to the person skilled in the art and do not therefore require any further explanation here.

The "man-machine interface of the device" may be formed by any means of the device suitable for communication between the device and the user.

In a preferred embodiment the man-machine interface comprises control elements (e.g. keys, rotary controls, etc.) arranged on a housing of the device and/or control panels provided on a touch-sensitive display device (screen) for user inputs. Such control panels may be generated by the software running on the computer device in any number and arrangement by an intrinsically known method. Such control panels can be actuated on the screen of the computer device by a simple press of the finger of the user and/or with the aid of a touch pen suitable for the device.

For device-user outputs the man-machine interface of the device preferably comprises luminous elements (e.g. LED's) arranged on a housing of the device and/or a display device (e.g. a touch-sensitive display device, in particular) and/or s speaker device (e.g. integrated in the housing).

In a preferred embodiment provision is made for the modification to comprise a change in the type of access to and/or supply of at least one function from the totality of the functions that can be provided by the device. Advantageously consideration may therefore be given to the fact that the function preferences of the user may typically vary with the connection of the device to the device support. In particular, provision can be made for the modification to allow a change in the selection of functions available to the user from the totality of the functions that can be provided by the device.

In particular the modification may, for example, involve a change in a software operating area, and/or an input method, and/or a path, and/or a characteristic of at least one type of output.

The modification may be easily carried out in a controlled manner by the software running on the computer device.

The totality of the functions that can be provided by the device comprises at least one from one of the following function categories:
  storage and editing of data (e.g. word-processing, table calculation, administration of contact data, etc.),
  data reproduction (e.g., in particular, reproduction of multi-media data, photographs, audio, video, e.g. stored on CD's, DVD's or other replaceable data carriers such as plug-in memory cards),
  communication (e.g. telephony, E-mail services, sending and receiving of faxes, remote control of devices, Internet access, etc.),
  navigation (in particular satellite supported (e.g. GPS) and/ or on the basis of a mobile telephone network, e.g. UMTS).

In a preferred embodiment the device has at least one system for data transfer between the device and a replaceable data carrier (e.g. disk, CD, DVD, memory card module, mobile telephone SIM card, etc.).

In a particularly preferred embodiment the device has identification means for reading identification information from the device support. Such means of identification advantageously enable a specific device support or a specific device support type to be detected, which, as mentioned above, imparts "environment sensitivity" to the device. For example, if the identification information read from the device support indicates that the device support is one which is provided for use in a motor vehicle, the modification of the man-machine interface effected by the processor-controlled computer device is able to give preference and "bring to the fore" the access, operation and output method for the functions of the device particularly preferred for mobile application.

From the point of view of "environment sensitivity" in particular, provision is made, in one embodiment, for the nature of the modification to be dependent on the read identification information.

The identification information from the device support may be provided in digital form, for example. For instance, this information may be provided as a device identification stored electronically in the device according to USB standard.

The identification information preferably contains information on an application environment type provided for the device support (e.g. mobile application, home application, office application, application in public premises or institutions, etc.). If the identification information is provided as a USB device identification, for example, a multiplicity of application environment types and/or device support types, and also follow-up information (e.g. serial number), can be coded in practice.

The identification means of the device and the detecting means of the device for detecting the presence of a connection to the device support may comprise a plug connector (e.g. USB socket) which, when the device is connected to the device support, necessarily makes an electrical connection which serves both for detecting the connection and as a data communication connection for reading the identification information.

In principle consideration is obviously given to providing for the detection of a connection on the one hand and the identification of a device support or device support type on the other, independently of each other, for example even when "mechanical means" are used.

In particular, if the identification information of the processor-controlled computer device read on the device support is provided for a modification of the man-machine interface adapted to the application environment, this modification may involve a change in input and/or output path of the devices which advantageously accompany activation and deactivation of additional input and/or output paths which run from the user via the device support to the device or vice versa. For example, when the device is connected to a "mobile device support", provision can be made for the function-=related inputs to be carried out by the user on control elements of the device support specially provided for this purpose, and corresponding input paths of the man-machine interface of the device are deactivated. In this case the modification comprises, for example, a deactivation of the input method "touch-sensitive screen", so that the screen is no longer used for inputs for only for outputs (e.g. text and graphics). As far as the change of output paths is concerned, provision can be made, for example, where the device is connected to a "home device support", for the video and audio output provided for isolated use of the device to be deactivated by the device screen or device speaker device, and for these types of outputs to be carried out by means of suitable entertainment electronic devices such as those are typically available for this application environment and can be connected to the device support.

In a further embodiment of the invention a system is provided for providing predetermined functions for a user of the system, wherein the system comprises a device of the type described above and at least one device support from a range of device support types associated with the device, and wherein the modification of the man-machine interface of the device is provided according to the device support type concerned.

In order to be combine the modification of the man-machine interface of the device provided according to the invention advantageously with an activation or deactivation of additional input or output paths, at least one input/output interface is arranged for at least one device support type on a housing of the device support, which interface can be used if the device support is connected to the device. Such interfaces may allow electrical and/or optical data input and/or data output, thereby supplementing the man-machine interface of the device to some extent by the paths running via the device support, or at least partially replacing them. A power supply for the device, or an energy source (e.g. battery) integrated init, can also be provided via such an interface.

In addition to the modification of the man-machine interface of the device caused by the making or isolation of a connection of the device to a device support, and activation or deactivation of additional communication paths between the user and device, provided if necessary, it is also conceivable to integrate any other peripheral devices for the device in the device support.

With regard to the preferred supply of device supports or device support types which are each associated with a particular type of application environment, peripheral devices, for example, may be provided only in the device supports or device support types in which the application environment allows the use, or preferential use, of these peripheral devices. In particular, the complexity of the device as such can be advantageously reduced by such a decentralisation of function-related usable components.

For example, it may be necessary in practice to cool the electronics operated in the device if a predetermined temperature is exceeded. For this purpose a fan device may, for example, be integrated in the device support for at least one device support type, which device can be used for cooling the device if there is a connection between the device and the device support. In this case a fan device in the device itself, which increases the overall size and the costs of the device, is unnecessary. The fan device may be integrated in the device support for the very device support types which are likely to be exposed to a critically high ambient temperature, e.g. mobile device supports, but not home or office device supports, for example.

BRIEF DESCRIPTION OF THE DRAWINGS

The invention is described in greater detail in the following on the basis of exemplary embodiments with reference to the attached drawings, in which:

FIG. 5 illustrates a video output mode of the device in FIG. 3 combined with a home device support.

DESCRIPTION OF THE PREFERRED EMBODIMENT(S)

Figure 1:
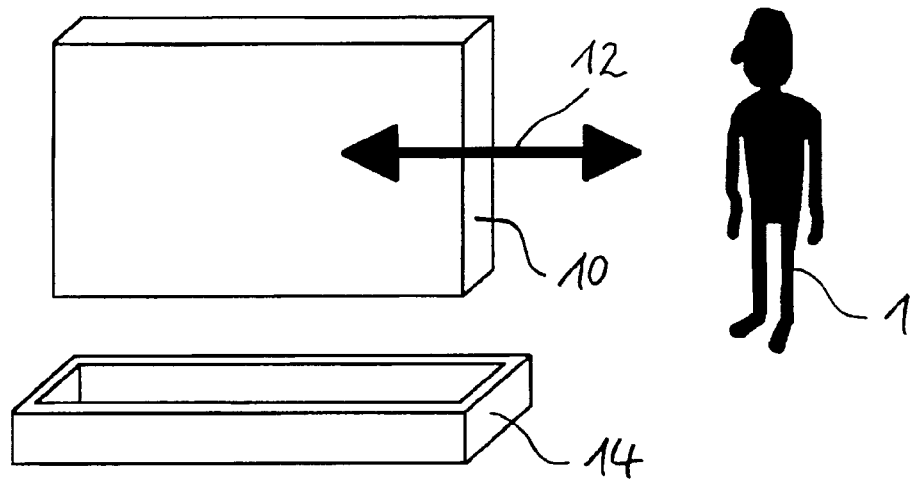
FIG. 1 shows a diagrammatic representation of a multifunction device when used in isolation.

FIG. 1 shows a multifunction device 10 for providing certain functions for a user 1 of the device.

The totality of the functions that can be provided by device 10 are very comprehensive in the exemplary embodiment shown. This is achieved in that a processor-controlled computer device is provided in device 10 for processing inputs of the user and for generating outputs of the device. Device 10 is generally an approximately cuboid, convenient, portable computer system on which a current computer operating system (e.g. "Windows Mobile" etc.), or even a proprietary operating system runs. Device 10 shown combines functions such a those known in conventional "notebook computers", navigation devices and mobile telephones.

A man-machine interface of device 10, which is symbolised in FIG. 1 merely by a double arrow 12, allows inputs by user 1 to device 10, and outputs from device 10 to user 1, relating to the functions that can be provided.

Device 10 also comprises, on its underside, coupling means for electrical and/or mechanical connection of device 10 to a device support 14 suitable for the device. These coupling means may, for example, be realised by means of an electrical plug connection and/or shaping of the device housing, which is adapted to the corresponding shaping of the device support. Such corresponding shapes can ensure mechanical stabilisation of the device on the device support or in a recess of the device support. In one embodiment provision is made for a detachable mechanical stop connection to be used between the device and the device support.

Figure 2:
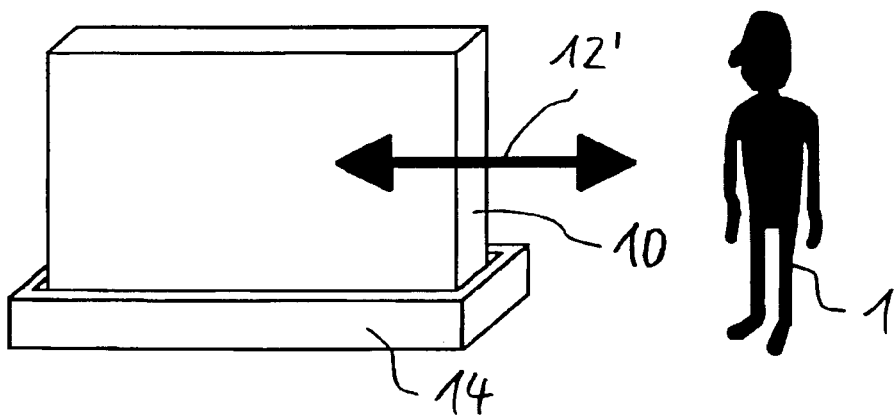
FIG. 2 shows a diagrammatic representation of the device when used in combination with a device support.

FIG. 2 shows device 10 after coupling or connection of the same to device support 14.

Since device 10 is provided with sensorics for detecting the presence of a connection that is connected to the processor-controlled computer device of device 10, the operating system software or monitoring running under it is able to detect the presence of the connection between device 10 and support 14.

When this connection is made, the processor-controlled computer device effects a modification of man-machine interface 12 to a modified man-machine interface 12'. As a result of this modification consideration may be advantageously given to a change in user preferences which typically accompanies the change from the isolated to the support-assisted use of device 10.

The same reference numbers are used in the following description of further exemplary embodiments for similar components, each supplemented by a small letter to distinguish the design. Here only the essential differences from the exemplary embodiment or embodiments are examined, with express reference made to the description of the preceding exemplary embodiments.

Figure 3:
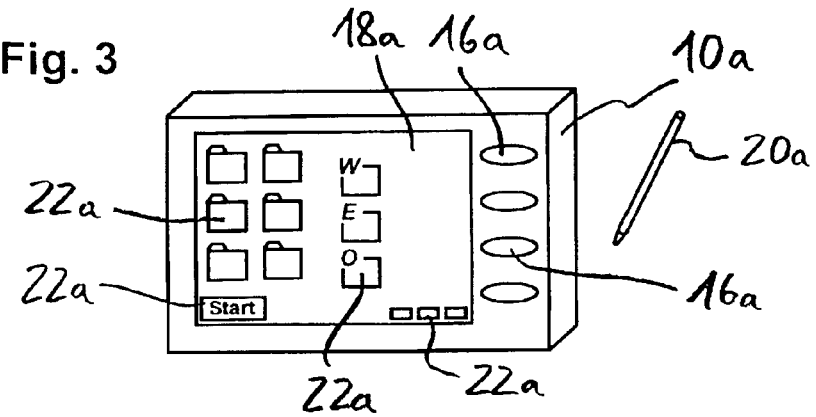
FIG. 3 illustrates a more special embodiment of the multifunction device.

FIG. 3 shows a more specific embodiment 10a of device 10 described above. Device 10a shown has a width of approx. 15 to 30 cm, a height of approx. 10 to 20 cm and a depth of approx. to 4 cm, and enables a current, graph-orientated operating system to be used in isolation in the situation shown in FIG. 3. For this purpose the man-machine interface of device 10a comprises operating keys arranged, for example, on the front of a housing, some of which keys are identified by 16a in the figure. Furthermore, a touch-sensitive screen 16a is provided on the front of the housing which is used both for the output of graphic information (including text) and for inputs by the user, whether by the simple press of a finger or with the aid of a touch pen 20a associated with device 10a. For such inputs via screen 18a, the software running on the computer device provides a specific arrangement of control panels within the graphic screen output, some of which are identified by 22a in the figure.

The man-machine interface of device 10a also comprises two speakers arranged concerned under a housing surface and connection sockets arranged on the back of the housing (e.g. according to current computer interface standards) for the connection of external devices.

Figure 4A:
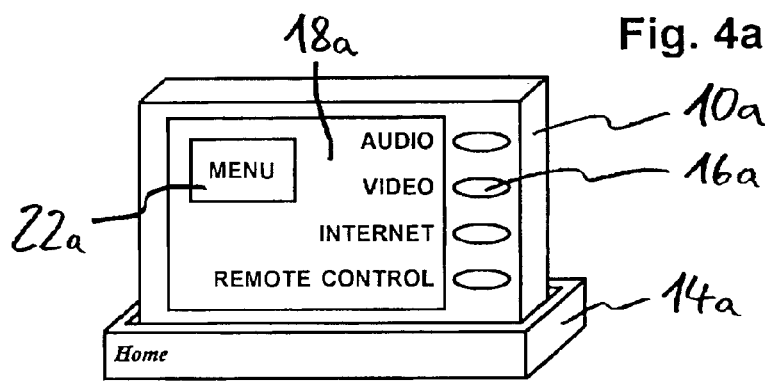
FIG. 4a to 4c illustrate the use of the device in FIG. 3 in three different application environments.
Figure 4B:
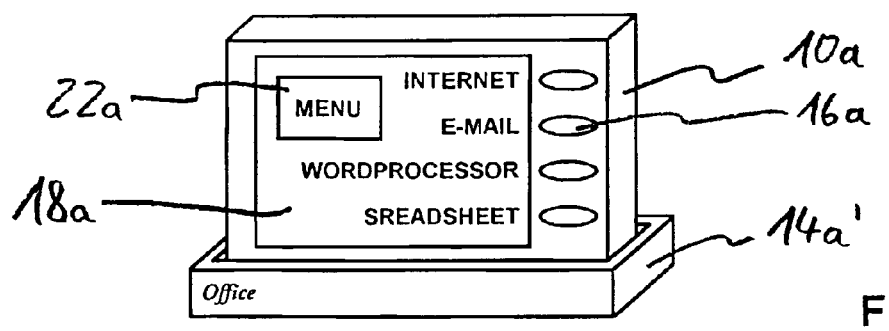
Figure 4C:
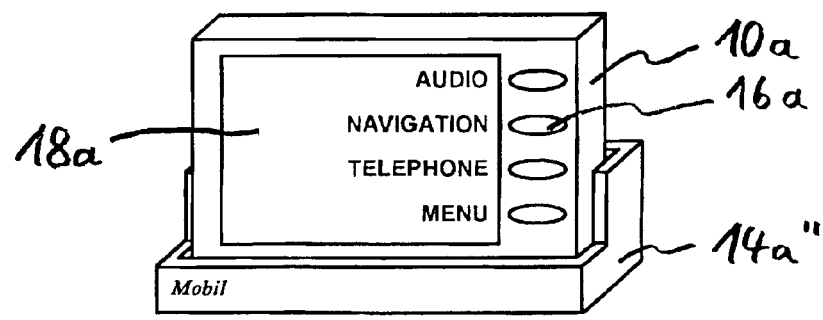

FIGS. 4a, 4b and 4c illustrate, by way of example, a modification of the man-machine interface which is automatically effected by the processor-controlled computer device when reacting to the insertion of device 10a in a device support 14a, 14a' and 14" associated with the device.

Support 14a shown in FIG. 4a is a support provided for private home sue, on whose back interface connections are arranged for connection to devices typically used in the private sector. Thee devices may, for example, be devices in entertainment electronics, e.g. a television set or a home cinema system. Furthermore provision is made in the exemplary embodiment shown for connection of support 14a to the Internet, whether the connection of an external Internet-ready device to support 14a, or by direct connection to a telephone connection in the home sector or a mobile telephone.

One peculiar feature of device 10a consists in the fact that the insertion of the device in support 14a is detected by the software running on it and identification information from support 14a configured as a USB device is also read at the same time and evaluated by the computer device. In the situation shown in FIG. 4a, device 10a and support 14a are connected to each other for this purpose by a USB plug connection. As a result of this software-controlled evaluation, a computer device establishes the way in which the man-machine interface of device 10a is to be modified.

In the exemplary embodiment shown the graphic user interface of the operating system concerned disappears from screen 18a and is replaced by pre-established screen-user interface which is specially adapted to the user preferences to be expected in the home sector.

In the example shown the functionality of the control elements, namely control keys 16a, is modified immediately after device 10a is inserted in support 14a. The new functionalities of the individual keys 16a are in this case displayed onscreen 18a as suitable operating instructions next to these keys. In the home sector, for example, provision can be made for applications (programs) to be called, by means of which applications an audio reproduction, a video reproduction, an Internet access and a remote control function (e.g. for controlling space heating, lighting or other "intelligent" domestic appliances), is provided.

The number, arrangement and selection of thee functions available in simplified form for the home sector from the totality of the functions that can be provided by device 10a may obviously also be other than those described here by way of example. Only the automatic adaptation of the interface between the user and the device is essential for the embodiment described, taking into consideration user preferences that are involved in the use of the support concerned.

The possibility of access to as many functions of the device a possible, in particular all other functions, should suitably also be retained when the connection is made between device 10a and support 14a. In the example shown this access to fewer interesting functions or programs in the function shown is provided by means of a control panel 23a specially displayed for this purpose (in FIG. 4a, left side).

When the user takes device 10a out of support 14a again, the man-machine interface of device 10a is returned to the initial condition for "isolated use" (cf. GIG. 3).

FIG. 4b illustrates the modification of the user interface on screen 18a, after device 10a has been inserted in a device support 14a', which is provided for use in an office or the like, and therefore belongs to another device support type. This other support type, or the application environment type provided for this, is presented to device 10a connected to it by the USB connection (and/or e.g. detection of mechanical locking). In the situation shown in FIG. 4a, the man-machine interface is also modified here too, but in this case other programs are provided for simple, fast calling. In the example shown this is an Internet access, an E-mail program, a word processing program and a table calculation program.

Finally, FIG. 4c illustrates the modification of the user interface effected by insertion of device 10a in a support 14a" provided for mobile use (e.g. in the motor vehicle).

In the example shown an audio system operation, navigation software and telephone operation are provided for direct calling by means of control keys 18a. One of keys 1a (at the extreme bottom of FIG. 4c) allows access to a menu for selecting further functions which are typically less usual in the mobile environment.

Supports 14a, 14' and 14a" shown in FIGS. 4a, 4b and 4c form a range of device support types (or some of them) and are each provided for use in a specific application environment type (as described).

In principle it is conceivable for one and the same outer shape or housing design to be provided for supports of several or all types, and for the supports to be distinguished solely in terms of the components contained in them (and of course their identification information). All conceivable connections for connecting external devices may also be provided with a housing type commonly provided for several support types, which in the individual case are actually connected to the device by the support, according to support type, and/or are connected to suitable electronics in the support. This is particularly advantageous in terms of simplified logistics in the manufacture of the device supports.

For example, supports 14a and 14a', shown in FIGS. 4a and 4b, are therefore identical in terms of their outer design. On the other hand, mobile support 14a" shown in FIG. 4c has modified coupling means and a higher projecting rear wall to guarantee particularly stable mounting of device 10a in support 14a", as is appropriate in the mobile application (e.g. in a vehicle).

FIG. 5 illustrates a home cinema mode of device 10a inserted in support 14a taking the example of the reproduction of a film stored on a DVD.

Even with isolated use of device 10a, such a DVD can be inserted in a DVD drive of device 10a (not shown) in order to reduce the film after suitable calling of a reproduction program, wherein the video and audio output is provided by screen 18a and the device speaker device respectively.

In the situation shown in FIG. 5, in which device support 14a is connected by an interface cable 24a to an external device (here television 26a), deactivation of the device-specific video and audio output paths is provided in addition to modification of the man-machine interface of device 10a (here a modification of the user interface formed from screen 18a and control keys 16a), and instead of this an activation of additional output paths, with the insertion of support 14a. The video and audio data are presented to the user by a screen 28a and speaker 30a of television 26a.

The operating area shown in FIG. 3, on screen 18a of device 10a, is provided connected exclusively to a device support of the "home use" type, in the specific type shown. The operating area shown advantageously uses device screen 18a for the graphic representation of the most important operating functions used in this situation by means of relatively large-area control panels 22a, which can be used very conveniently by finger touch.

As described with reference to FIGS. 4a to 4c, however, access to further functions of device 10a is also possible, here by actuating control key 16a arranged right at the bottom of FIG. 5, the current function of this key being indicated by a suitable reference (here: the text "MENU") on the screen.

Moreover, status information such as chapter number and reproduction time, are displayed in an output field 32a provided specially for this during the DVD reproduction.

If the user takes device 10a out of support 14a again in this situation, the output paths peculiar to device 10a are automatically used again, i.e. the reproduction takes place via device screen 18a and the speaker device integrated in the device. In this connection the man-machine interface is also modified again in terms of the user inputs, so that control keys 16a are associated with suitable functions, which can also be symbolised on the right edge of the screen, for example.

Figure 6:
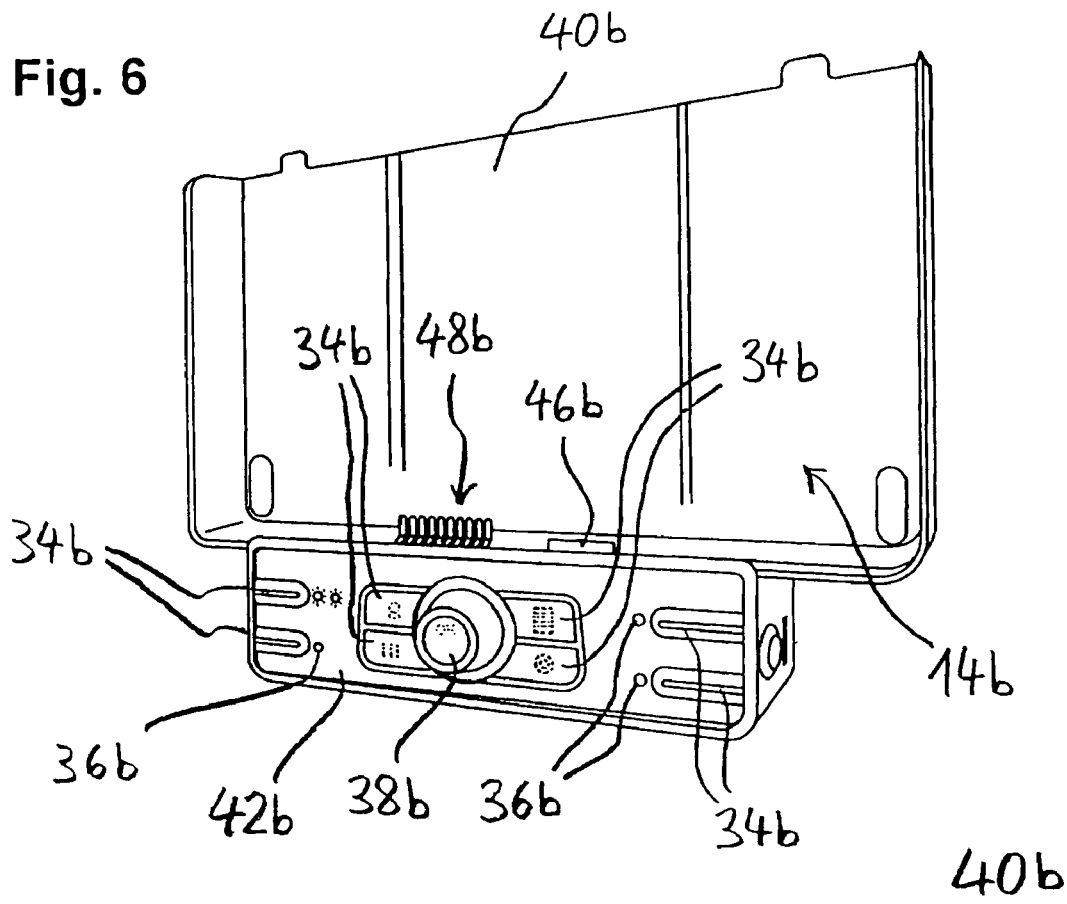
FIG. 6 shows a perspective view of a more special embodiment of a device support from the front.
Figure 7:
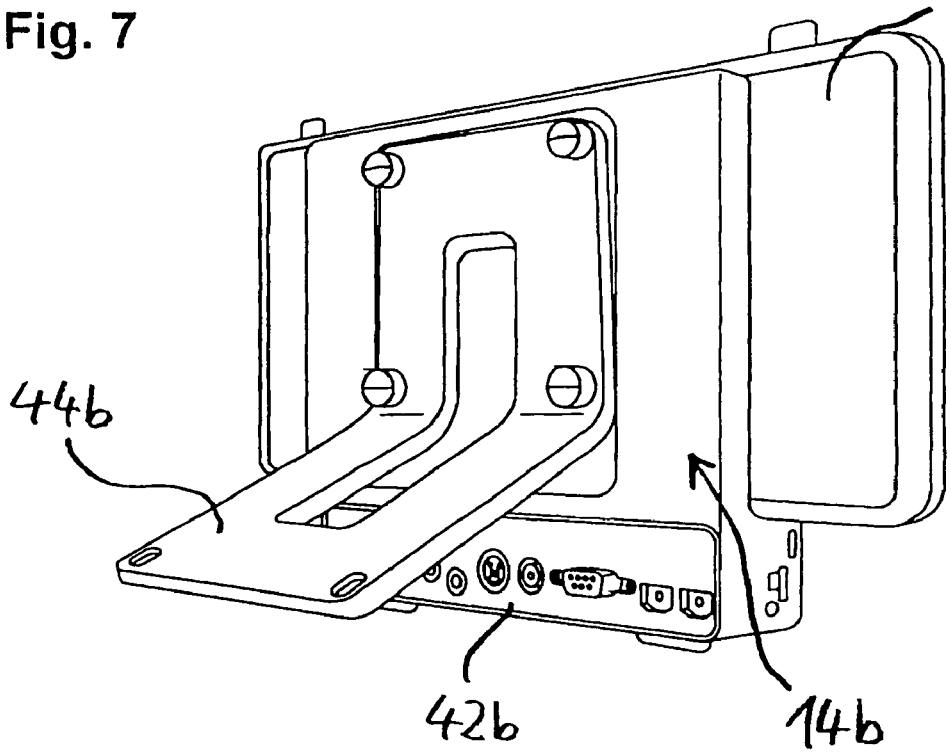
FIG. 7 shows a perspective view of the device support in FIG. 6 from behind.

FIGS. 6 and 7 show an embodiment of a device support 14b provided for mobile use, particularly in a motor vehicle.

Control keys 34*b*, indicator lights 36*b* and a centrally located rotation/pressure control 38*b* are arranged on the front side (cf. FIG. 6) of mobile support 14*b*, so that they are easily accessible to the user. Further input paths, particularly well adapted to this application, are created with these additional control elements for the mobile use of the device (not shown).

This device to be connected to this support 14*a*, not shown, is designed in the shape of a rectangular plate, on its front side, as just described with reference to FIGS. 3 to 5.

For stable support of the unit, particularly when used in the fittings area of a motor vehicle, support 14*b* has a rear support wall 40*b* that extends over a large area, at the top of which wall is supported the device housing when in use. Support wall 40*b* is connected at the top to a support body 42*b*, which contains all electronic components of support 14*b*, by means of which, in particular, digital information from the support is stored, and the use of the additional input/output means 34*b*, 36*b*, 38*b* is guaranteed.

Connection sockets are arranged, in particular, on the back (cf. FIG. 7) of device support 14*b*, for connecting external devices. These connection sockets may, for example, represent interfaces according to current standards, e.g. for connecting a television, as described above with reference to FIG. 5, an external computer (e.g. PC), or other devices (speakers, etc.).

A support 44*b* is detachably fitted (here: screws) to the back of support 14*b*. Support 44*b* shown is used to create the combination of the unit and unit support 14*b* on any flat surface. When the device is used in specific vehicles, support 44*b* support 44*b* may therefore easily be replaced by a support specially adapted to the vehicle, which can then be suitably secured in the vehicle.

The electrical connection of the unit to unit support 14*b* is made, among other things, by means of plug device 46*b*, which interacts with a corresponding socket device of the device concerned (here: according to USB standard).

A peculiar feature of the embodiment illustrated in FIGS. 6 and 7 consists in the fact that the device concerned has no fan for cooling electronic device components. However, these device components can be cooled by a fan integrated in support body 42*b* if the device is connected to support 14*b*. For this prose air outlet slots 48*b* are provided on the top of support body 42*b*, which slots lie flush with correspondingly arranged air inlet slots of the device inserted in the support, so that if necessary (e.g. at high ambient temperature), cooling air can be allowed to flow from support 14*b* via the ventilation slot arrangement into the interior of the device housing. The temperature-dependent actuation of the cooling device (fan) is controlled by software in the computer device of the device. This partial decentralisation of the cooling components advantageously reduces the construction cost and the overall size of the device concerned.

The invention claimed is:

1. A system (14, 10) for providing predetermined functions for a user (1) of the system, comprising
 a device support (14) from a range of different device support types, each device support type being provided for a respective application environment type, and each device support (14) storing identification information on the application environment type provided for this device support (14), and
 an electronic device (10) for providing the predetermined functions for the user (1) of the device, comprising
  a man-machine interface (12, 12') of the device to allow function-related inputs by the user (1) and function-related outputs of the device (10),
  a processor-controlled computing device for processing the inputs of the user and generating the outputs of the device (10),
  means of coupling for the electrical and/or mechanical connection of the device (10) to a device support (14) associated with the device, and
  detection means for detecting the presence of a connection of the device (10) to the device support (14) and for reading the identification information from the device support (14),
 wherein the processor-controlled computing device effects a modification of the man-machine interface (12, 12') in the presence of the connection,
 wherein the modification of the man-machine interface (12, 12') of the device (10) is provided according to the identification information read and thus according to the device support type concerned, and is adapted to the respective application environment type, and comprises
 a change in the nature of the access to at least one function from the totality of functions that can be provided by means of the device (10), and
 a change in the nature of supply of this function by means of a change in a software operating interface.

2. The system according to claim 1, wherein the man-machine interface (12, 12') of the device comprises control elements (16) arranged on a housing of the device for inputs of the user (1).

3. The system according to claim 1, wherein the man-machine interface (12, 12') of the device comprises control panels (22) provided on a touch-sensitive display device (18) for inputs of the user (1).

4. The system according to claim 1, wherein the man-machine interface (12, 12') of the device comprises luminous elements (36) arranged on a housing of the device for outputs of the device (10).

5. The system according to claim 1, wherein the man-machine interface (12, 12') of the device comprises a display device (18).

6. The system according to claim 1, wherein the man-machine interface (12, 12') of the device comprises a speaker device.

7. The system according to claim 1, wherein the modification provides for a change in the selection of functions available to the user (1) from the totality of the functions that can be provided by means of the device (10).

8. The system according to claim 1, wherein the modification comprises a change in the input method.

9. The system according to claim 1, wherein the modification comprises a change in the path and/or a characteristic of at least one type of output.

10. The system according to claim 1, wherein the totality of the functions that can be provided by means of the device comprises at least one function from one of the following function categories:
 storage and editing of data,
 data reproduction
 communication
 navigation.

11. The system according to claim 1, wherein the device has at least one device for data transfer between the device and a replaceable data carrier.

12. The system according to claim 1, wherein the identification information is provided in digital form.

13. The system according to claim 1, wherein at least one input/output interface (42) is arranged on a housing of the device support (14) for at least one device support types wherein this interface can be used by the device (10) if the device is connected to the device support.

14. The system according to claim 1, wherein a fan device is integrated in the device support (14) for at least one device support type, wherein this fan device can be used for cooling the device if the device (10) is connected to the device support (14).

15. The system according to claim 1, wherein the modification of the man-machine interface (12, 12') involves a change in input and/or output paths of the device accompanied by an activation or deactivation of additional input and/or output paths which run from the user via the device support (14) to the device (10) or vice versa.

* * * * *

UNITED STATES PATENT AND TRADEMARK OFFICE
CERTIFICATE OF CORRECTION

PATENT NO. : 7,646,376 B2 Page 1 of 1
APPLICATION NO. : 11/482382
DATED : January 12, 2010
INVENTOR(S) : Blersch It is certified that error appears in the above-identified patent and that said Letters Patent is hereby corrected as shown below:

In column 10, line 67, delete the word "types" and insert therefor --type,--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,646,376 B2 | Page 1 of 1 |
| APPLICATION NO. | : 11/482382 | |
| DATED | : January 12, 2010 | |
| INVENTOR(S) | : Christian Blersch | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Sixteenth Day of November, 2010

David J. Kappos
*Director of the United States Patent and Trademark Office*